US005134747A

United States Patent [19]

Roesler

[11] Patent Number: 5,134,747

[45] Date of Patent: Aug. 4, 1992

[54] UNIVERSAL PAINT BRUSH GUIDE

[76] Inventor: Guenter Roesler, 151 Tremont St., Boston, Mass. 02111

[21] Appl. No.: 656,220

[22] Filed: Feb. 15, 1991

[51] Int. Cl.[5] .................. A47L 1/00; B60S 1/00

[52] U.S. Cl. .................. 15/246; 15/159.1

[58] Field of Search .................. 15/246, 248 R, 166, 15/175, 159 R

[56] References Cited

U.S. PATENT DOCUMENTS 1,697,756 1/1962 Curran .................. 15/166
2,917,763 12/1959 Kurschner .................. 15/246
2,947,018 8/1960 Kurschner .................. 15/246
3,037,231 6/1962 Kurschner .................. 15/246

*Primary Examiner*—Philip R. Coe
*Assistant Examiner*—Tony G. Soohoo
*Attorney, Agent, or Firm*—John P. McGonagle

[57] ABSTRACT

A U-shaped mounting member which is attached to the ferrule of a paint brush. The mounting member has a guide pin holder formed at its base adapted to hold a guide pin. The guide pin is inserted into the guide pin holder and is slidably and rotatably operable to assist in the application by said brush of paint to a precise surface area.

13 Claims, 2 Drawing Sheets

UNIVERSAL PAINT BRUSH GUIDE

BACKGROUND OF THE INVENTION

This invention relates to paint brush attachments, and more particularly to a guide device adapted to be attached to or incorporated into a paint brush.

The application of paint accurately in a straight line in these circumstances by means of a hand-held brush is a highly skilled task requiring experience and a steadier hand than most people possess.

According to the traditional method for accurate painting along a straight edge or separating line, a length of sticking tape is used to define the line and isolate and shield the side of the line to remain unpainted. The tape is then removed after completion of the paintwork. This method tends to be messy, costly and time consuming.

SUMMARY OF THE INVENTION

In view of the foregoing disadvantages inherent in the traditional method, the present invention provides an improved paint brush guide. As such, the general purpose of the present invention, which will be described subsequently in greater detail, is to provide a simple, efficient, inexpensive and durable attachment for a paint brush which will enable a painter to guide the brush along the edge of a narrow surface and control the application of paint to that surface without extending the paint outside the desired area.

A further object of the present invention is to provide a guide which can be easily applied to a wide variety of paint brushes and which can, while on the brush, be easily moved to an operable or inoperable position.

It is still another object of the present invention to provide a guide constructed so that the painter may also slide the guide pin to a retracted position when dipping the paint brush bristles into a paint can, thus preventing the guide from coming in contact with the paint.

It is another object of the present invention to provide a guide which is adjustable to a wide range of guiding positions.

An alternative object is to provide a guide which can easily be removed from a paint brush.

To attain these objects, the present invention is comprised of a simple U-shaped mounting member which is attached to the brush head. The mounting member has a guide pin holder formed at its base adapted to hold a guide pin. The guide pin is inserted into the guide pin holder and is slidably and rotatably operable to assist in the application by said brush of paint to a surface accurately along inside corners, outside corners, door and window trim, base boards, ceilings, moldings and the like.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated present preferred embodiments which the invention may assume of the invention.

DETAILED DESCRIPTION OF THE INVENTION

Figure 1:
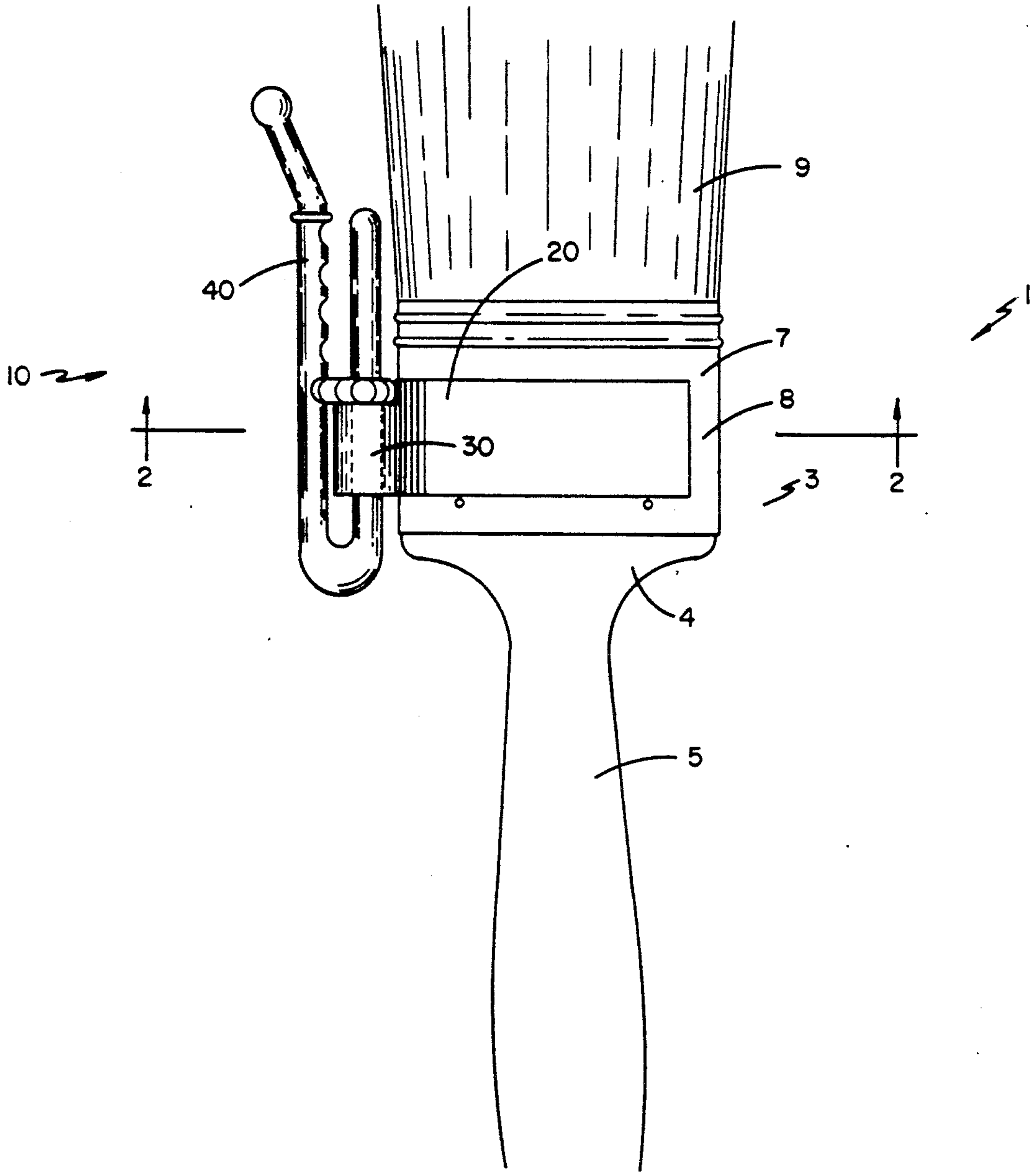
FIG. 1 is a front elevational view of an embodiment of the present invention installed on a conventional paint brush.
Figure 2:
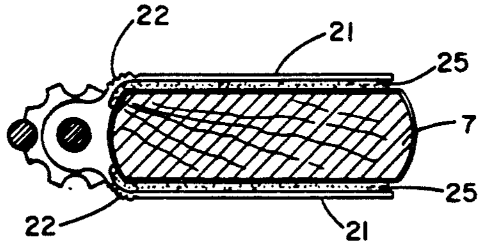
FIG. 2 is a cross sectional view of the invention installed on a paint brush along the line 2—2 of FIG. 1.
Figure 3:
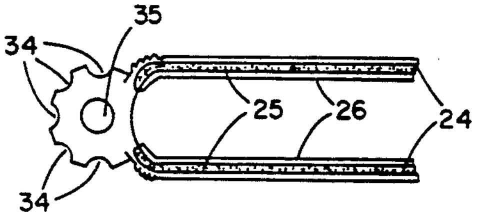
FIG. 3 is a top view of the invention mounting member shown in FIG. 1.
Figure 4:
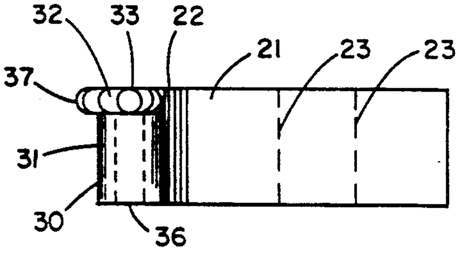
FIG. 4 is a front elevational view of the invention mounting member shown in FIG. 3.
Figure 5:
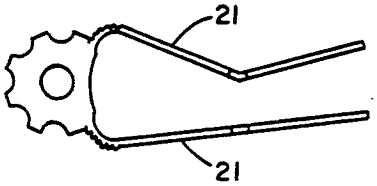
FIG. 5 is another embodiment of the mounting member shown in FIG. 3.
Figure 6:
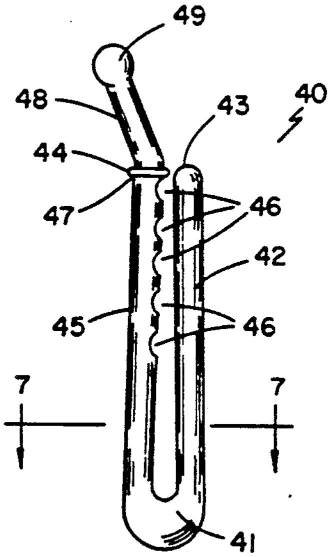
FIG. 6 is a front elevational view of the guide pin shown in FIG. 1.
Figure 7:
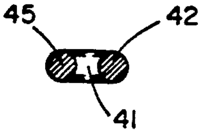
FIG. 7 is a section view of the guide pin along the line 7—7 of FIG. 6.

Referring to the drawings in detail wherein like elements are indicated by like numerals, reference number 1 applies to a conventional paint brush consisting of a flattened head 3 from which projects a handle 5 (shown fragmentarily but of any desired length) for manual manipulation of the brush 1, and on which is affixed a ferrule 7, usually metallic, in which are bound a bundle of bristles 9 (also shown fragmentarily but of any desired length) forming the operative portion of the brush 1, said bristles 9 extending from the head 3 oppositely to the handle 5. Although the paint brush 1 used for illustration purposes in the attached drawings has a generally rectangular cross section, the instant invention is equally applicable to round bodied brushes such as those used by artists and graphic illustrators.

The trim guide attachment forming the subject matter of the present invention is indicated generally by the numeral 10, and includes a mounting member 20 adapted to be attached to the brush head 3 over the ferrule 7 thereof and a guide pin 40 rotatably and slidably connected to the mounting member 20.

The mounting member 20 has a U-shape with its two arms 21 extending transverse to the longitudinal axis of the brush 1 across a portion of the ferrule 7. The base of the U-shaped mounting member 20 is formed into a generally cylindrical guide pin holder 30 with its longitudinal axis parallel to the paint brush longitudinal axis. The mounting arms 21 are connected to the pin holder 30 by means of a series of hinges 22 connected to the pin holder's external body 31. The trim guide attachment 10 in this embodiment is made of plastic and the hinges 22 are formed by a series of parallel scores in the arms 21 near to the base 30 transverse to the general longitudinal axis of the arms 21, thereby forming hinges adjustable to the thickness of the brush handle 5. This allows the guide 10 to fit brushes having a wide variety of thicknesses. The mounting member arms 21 in this embodiment have three inch lengths with scored break seams 23 formed transversely on the arms at distances of one inch and two inches from the hinges 22. Other embodiments could have the break seam 23 spaced differently. For brushes 1 less than three inches in size (width), the member arm lengths may be reduced in one inch increments by breaking the arms 21 along the scored break seams 23. Since most trim brush sizes range from one and one-half inches to three and one-half inches, the guide will fit most standard trim brush sizes.

The insides 24 of the arms 21 have adhesive 25 applied thereon with removable protective paper 26 covering the adhesive 25 until guide 10 installation on a brush 1. As stated above, the arms 21 may be sized by means of the scored break seams 23 wherein the arm 21 lengths can be reduced in one inch increments by tearing the arms 21 along the break seams 23. The protective paper 26 on the adhesive 25 along the arm insides 24 is then removed, and the mounting member arms 21 are positioned across and attached to the brush ferrule flat surfaces 8. The hinge arrangement 22 permits installation of the mounting member 20 on brushes having a variety of thicknesses.

The guide pin holder 30 has a central, longitudinal, internal, cylindrical opening 35 along its length and has an outwardly extending radial flange 32 at its longitudinal bristle end 33. The flange 32 has a plurality of notches 34 formed radially about its external lip 37. The guide pin 40 is inserted into the holder central opening 35 from the longitudinal handle end 36 of the holder 30.

The guide pin 40 has a junction 41 with two spaced and converging members 42, 45 emanating therefrom in the same general direction and plane. The members 42, 45 have a round cross section and a radial diameter slightly less than the radial diameter of the holder central opening 35. The member 42 is defined as the holder member of the guide pin 40. The guide pin 40 is installed in the holder 30 insertion of the holder member 42 into the holder central opening 35 from the holder's longitudinal handle end 36. The resultant guide pin junction 41 position is approximately parallel to the vicinity of the junction 4 of the brush head 3 and handle 5. The other guide pin member 45 is defined as the guide member and has a series of equispaced notches 46 along its longitudinal length. The notches 46 are positioned to face the holder member 42. The guide member end 47 away from the junction 41 terminates in a guide section 48 which is a short length oppositely divergent from the holder member 42 and terminating in a spherical portion (ball) 49. The holder member 42 length is approximately equal to the length of the guide member 45 from the junction 41 to the beginning 44 of the guide section 48. In this embodiment the angle of divergence of the guide section 48 from the installed holder member 42 is approximately thirty degrees.

In this embodiment of the invention the guide pin 40 is made from a stiff plastic. The bristle end 43 of the uninstalled holder member 42 nearly touches the beginning of the guide section 44. The guide pin junction 41, although made from a stiff plastic, has some residual resiliency, thereby providing a contracting spring effect on the divergent pin members 42 and 45 when separated. During installation of the guide pin 40 in the guide pin holder 30, the pin holder member 42 is moved away from pin guide member 45. After installation, the contracting spring effect of the guide pin junction 41 brings the pin guide member 45 towards the pin holder member 42. This causes the pin guide member notches 46 to engage the holder radial flange notches 34.

In operation, the spherical portion (ball) 49 of the guide pin 40 is the positioning fulcrum for the paint brush 1. The guide pin ball 49 may be moved longitudinally along the brush by means of changes in interaction of the various pin guide member notches 46 with a given holder radial flange notch 34. There is sufficient resiliency in the guide pin junction area 41 wherein the guide pin members 42 and 45 may be separated enough to change notch 46, 34 engagements. In the same manner as with the longitudinal adjustments, the guide pin ball 49 may be moved radially about a portion of the brush's longitudinal axis by changes in the interaction of a given pin guide member notch 46 with various holder notches 34.

In an alternative embodiment of the invention, the mounting member arms 21 are resiliently convergent, thereby resiliently pressing against the brush ferrule 7 when the mounting member 20 is installed on the brush. The mounting member 20 in this embodiment is preferably made of spring metal or like material. This eliminates the use of adhesive on the arm insides 24 and permits the trim guide 10 to be removed from the paint brush 1 after use.

In still another embodiment of the invention, the ferrule 7 may be modified so that the mounting member arms 21 are eliminated and the pin holder 30 incorporated directly onto the ferrule 7.

It is understood that the above-described embodiments are merely illustrative of the application. Other embodiments may be readily devised by those skilled in the art which will embody the principles of the invention and fall within the spirit and scope thereof.

I claim:

1. A trim guide for use in combination with a paint brush having a head from which projects a handle and on which head is affixed a ferrule in which are bound a bundle of bristles said bristles extending from the head oppositely to the handle said brush's longitudinal axis running from handle through ferrule to bristles, comprising:

a U-shaped mounting member adapted to be attached to the brush head over the ferrule thereof said mounting member being comprised of:

a base formed into a generally cylindrical guide pin holder having an external body, a central, longitudinal, internal opening with a circular cross section along the holder's length, two opposite ends and a longitudinal axis running from end to end, one of said opposite ends being nearest the paint brush handle and the one of said opposite ends being nearest the paint brush bristles and having a flange radially extending outwardly from said pin holder external body said flange terminating in an external lip containing a plurality of notches formed radially about said lip, said holder longitudinal axis being parallel to the paint brush longitudinal axis, and two arms extending from said base transversely to the longitudinal axis of the brush across a portion of the ferrule and connected to said pin holder by means of a series of hinges connected to the pin holder's external body; and a guide pin rotatably and slidably connected to said base wherein said guide pin has a general U-shape and is comprised of a junction with two oppositely spaced and converging members emanating therefrom and lying in the same general plane.

2. A trim guide according to claim 1 wherein:

said converging members have a round cross section and a radial diameter slightly less than the radial diameter of said pin holder central longitudinal, internal opening.

3. A trim guide according to claim 2 wherein:

one converging member is defined as the holder member of the guide pin and is inserted into the longitudinal end of the pin holder central opening nearest the paint brush handle.

4. A trim guide according to claim 3 wherein:

the other said guide member is defined as the guide member of the guide pin and said member has a series of equispaced notches along its longitudinal length, said notches positioned to face said holder member.

5. A trim guide according to claim 4 wherein:

the guide member end away from said junction terminates in a guide section comprising a short length at an angle diverging from said holder member and terminating in a spherical ball.

6. A trim guide according to claim 5 wherein:

said mounting member arms have a plurality of equispaced scored break seams formed transversely thereon.

7. A trim guide according to claim 5 wherein:

the insides of said mounting member arms have adhesive applied thereon with removable protective paper covering said adhesive until guide installation on said brush.

8. A trim guide according to claim 5 wherein:

said mounting member arms are resiliently convergent, whereby said mounting member arms resiliently press against the brush ferrule when the mounting member is installed on the brush.

9. A trim guide for use in combination with a paint brush having a head from which projects a handle and on which head is affixed a ferrule in which are bound a bundle of bristles said bristles extending from the head oppositely to the handle said brush's longitudinal axis running from handle through ferrule to bristles, comprising:

a mounting member adapted to be incorporated onto the said ferrule thereof said mounting member being comprised of a base formed into a generally cylindrical guide pin holder having an external body, a central, longitudinal, internal opening with a circular cross section along the holder's length, two opposite ends and a longitudinal axis running from end to end, one of said opposite ends being nearest the paint brush handle and the one of said opposite ends being nearest the paint brush bristles and having a flange radially extending outwardly from said pin holder external body said flange terminating in an external lip containing a plurality of notches formed radially about said lip, said holder longitudinal axis being parallel to the paint brush longitudinal axis; and a guide pin rotatably and slidably connected to said base wherein said guide pin has a general U-shape and is comprised of a junction with two oppositely spaced and converging members emanating therefrom and lying in the same general plane.

10. A trim guide according to claim 9 wherein:

said converging members have a round cross section and a radial diameter slightly less than the radial diameter of the pin holder central longitudinal, internal opening.

11. A trim guide according to claim 10 wherein:

one converging member is defined as the holder member of the guide pin and is inserted into the longitudinal end of the pin holder central opening nearest the paint brush handle.

12. A trim guide according to claim 11 wherein:

the other said converging member is defined as the guide member of the guide pin and said guide member has a series of equispaced notches along its longitudinal length, said notches positioned to face said holder member.

13. A trim guide according to claim 12 wherein:

the guide member end away from said junction terminates in a guide section comprising a short length at an angle diverging from said holder member and terminating in a spherical ball.

* * * * *